United States Patent [19]

Telder

[11] Patent Number: 5,603,362
[45] Date of Patent: Feb. 18, 1997

[54] PRO SUPER OIL CHANGER

[76] Inventor: Patrick Telder, 2821 Estey Ave., D-4, Naples, Fla. 33942

[21] Appl. No.: 618,254

[22] Filed: Mar. 18, 1996

[51] Int. Cl.$^6$ .............................. B65B 1/04; B65B 3/04; B67C 3/02
[52] U.S. Cl. .................. 141/98; 141/86; 141/87; 141/231; 184/106
[58] Field of Search ............................ 141/86, 87, 88, 141/98, 231, 311 A, 331, 340, 341; 184/1.5, 106; 4/520, 522, 516, 518, 519, 645, 653, 656, 659, 637, 625

[56] References Cited

U.S. PATENT DOCUMENTS

| | | | |
|---|---|---|---|
| 5,188,156 | 2/1993 | Littlepage | 141/98 |
| 5,305,481 | 4/1994 | Nebb | 4/645 |
| 5,330,579 | 7/1994 | Rushing et al. | 134/12 |
| 5,381,839 | 1/1995 | Dowd | 141/242 |

*Primary Examiner*—Henry J. Recla
*Assistant Examiner*—Timothy L. Maust
*Attorney, Agent, or Firm*—Frank A. Lukasik

[57] ABSTRACT

An efficient apparatus for changing oil, hydraulic components, solvents, and fuel cells with the least amount of fluid spills. The apparatus comprises a collecting tray for collecting the liquids, a vertical stand and a base having casters. The collecting tray is adjustable vertically to accommodate different sized aircraft. The collecting tray contains a trap door which may be opened to accommodate an aircraft landing gear. The collected liquids are fed through a tube into plastic containers.

3 Claims, 7 Drawing Sheets

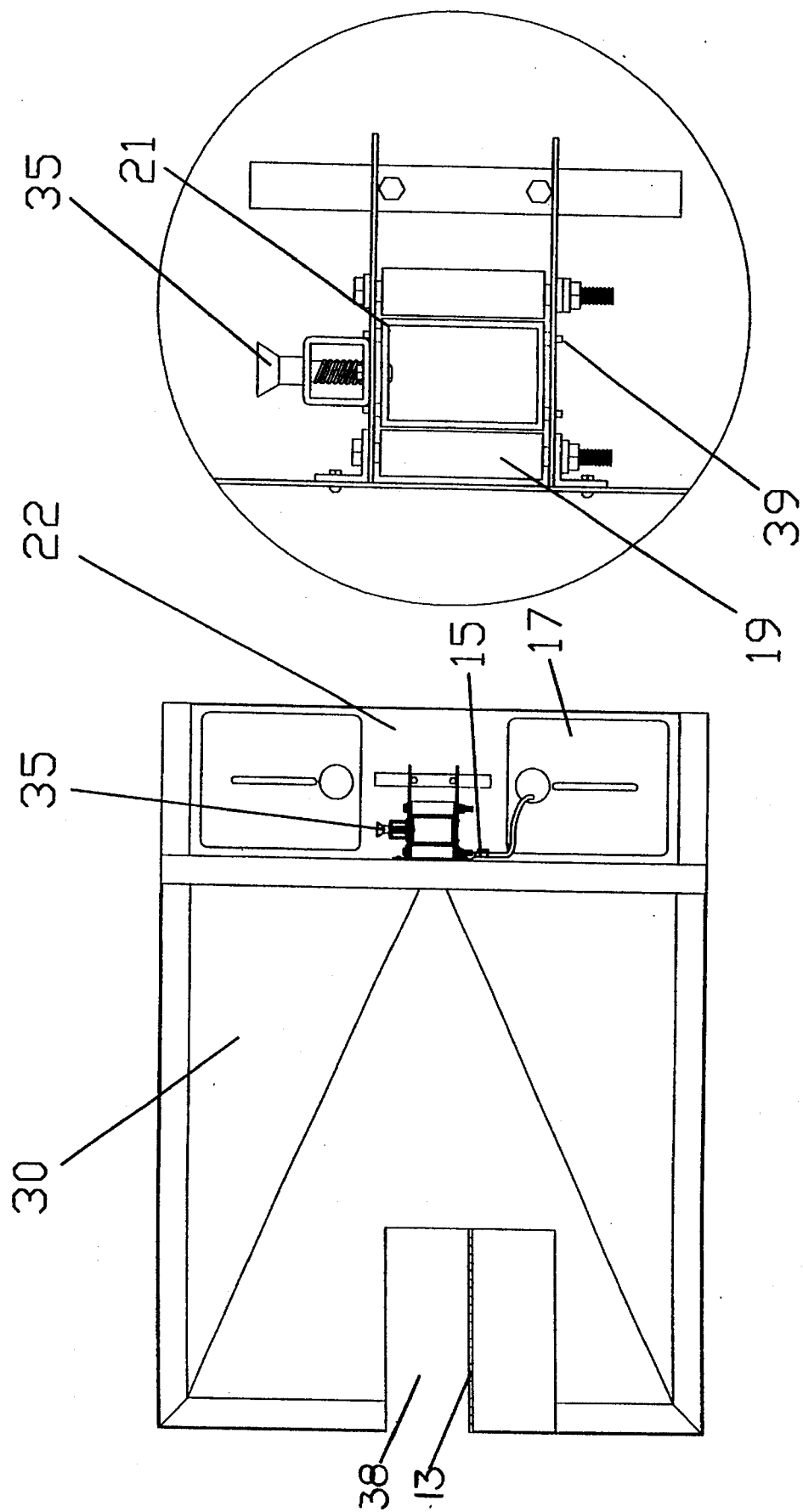

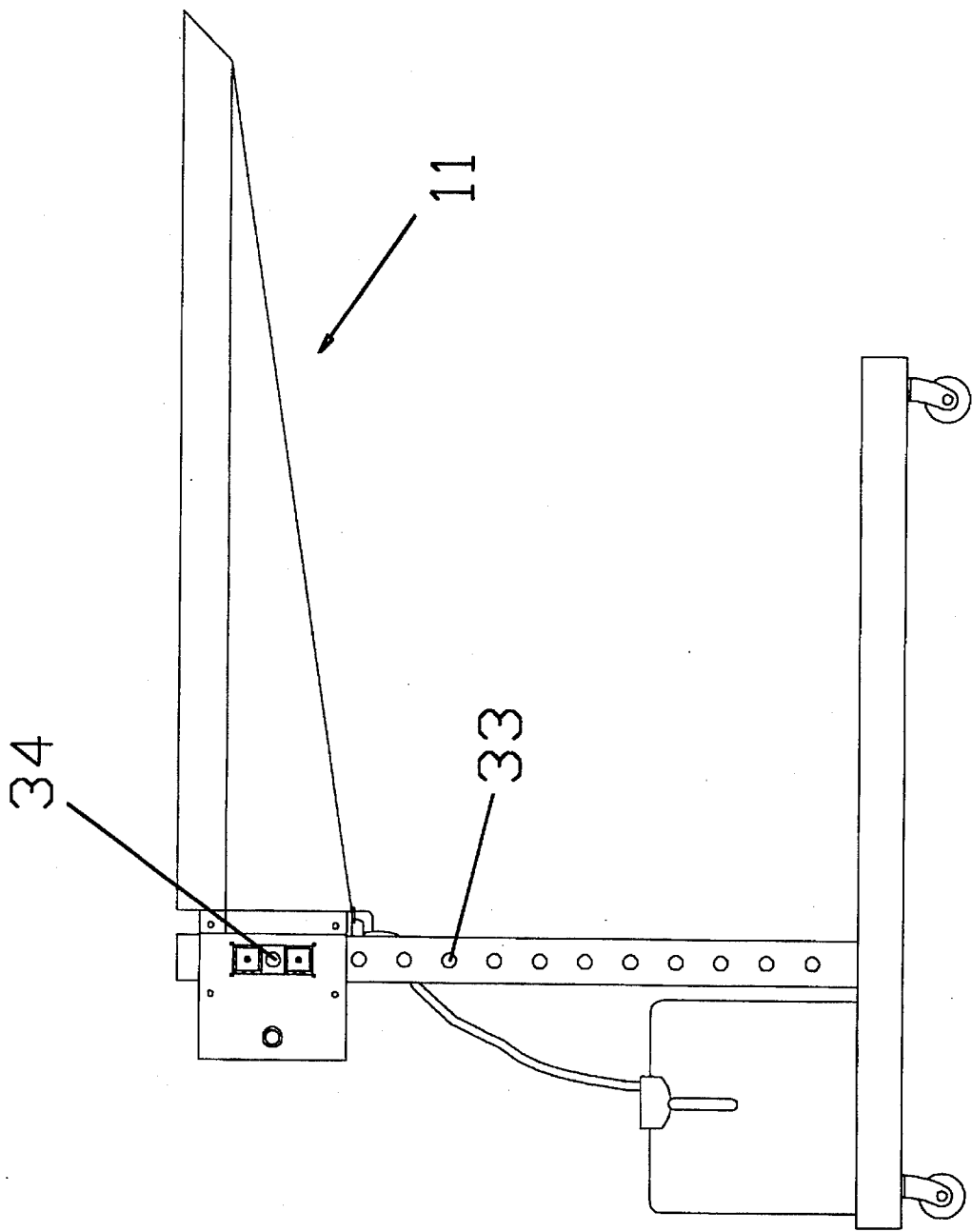

PRO SUPER OIL CHANGER

BACKGROUND OF THE INVENTION

1. Field of the Invention

The present invention relates generally to a liquid collector and more particularly to an efficient device to change oil, hydraulic components, fuel cells, and for collecting spent solvent with the least amount of fluid spills, especially for aircraft.

2. Description of The Prior Art

Recycling apparatus of various types are utilized throughout the prior art. The collecting and disposing of oil and solvents from an associated vehicle becomes an ecological as well as sanitary consideration. There are numerous prior art devices for filling a plurality of containers for various reasons with various fluids from a common source.

One example of of a prior art device for removing fluids is Littlepage U.S. Pat. No. 5,188,156 which discloses a waste recycling apparatus which includes a storage container arranged for vertical mounting to a support surface, the storage container mounts an outlet conduit and valve. The container is provided with a cavity to receive and store a fluid-receiving pan container permitting ease of disposal of waste oil from an associated vehicular oil change. Waste containers are thereafter positioned below the storage container conduit to receive the waste oil for subsequent recycling.

Rushing et al U.S. Pat. No. 5,330,579 discloses an apparatus for spent solvent collection which includes a portable carriage positionable beneath the airplane, a receptacle having spaced side walls and carried by the carriage, the side walls extending vertically upwardly, the receptacle further defining a receptacle bottom portion, the receptacle receiving spent solvent in both the liquid and the vapor phase after application of the solvent to the airplane and dissolution of the paint, the side walls directing the received solvent in both phases to the receptacle bottom portion such that vapor phase is trapped above the heavier liquid phase by the lighter air thereover, and an exhaust port located above the receptacle bottom portion for removing the vapor phase.

Dowd U.S. Pat. No. 5,381,839 discloses a liquid disburser device including a top member having an upper funnel chamber section for receiving liquid and a lower liquid discharge column leading downwardly from the upper funnel chamber section; the lower discharge column including an inner diameter of sufficiently reduced size whereby liquid enters the discharge column from the upper funnel chamber in a filling equal amount; the discharge column having a plurality of equally angularly spaced tubular members spaced in equal distance about the bottom portion of the discharge column; the tubular members extending downwardly and having respective end portions adapted to be inserted into the inlet of a liquid container for conducting equal amounts of liquid from the funnel chamber into respective containers to be filled therefrom.

As such, it may be appreciated that there continues to be a need for a new and improved waste oil and solvent recycling apparatus as set forth by the instant invention which will address both the problems of ease of use as well as effectiveness in construction and in this respect, the present invention substantially fulfills this need.

SUMMARY OF THE INVENTION

The invention is an efficient way to change oil, hydraulic components, solvents and fuel cells, with the least amount of fluid spills. The device is constructed of aluminum and attaches to an adjustable frame that will adapt to everything from ultralights to a Boeing 777. A hinged door on the front opens to permit the oil changer to fit around the nose wheel of single engine aircraft to ensure complete capture of the fluids.

The invention is completely mobile, with its four heavy duty casters that make it glide across any hard surface with ease. The hinged door on the front opens to fit around the nose wheel of single engine aircraft to ensure complete capture of fluids. The process of changing oil is messy and it is difficult to maintain a professional look about the work area. The instant invention not only catches the drained fluid, but also captures the cleaning solvents in a separate container for reuse and easy disposal. With the high cost of cleaning solvents, along with the disposal problems, this environmental friendly work aid will be invaluable. By being able to reuse the solvent, less than one half of what was previously used is presently used. This is accomplished by reclaiming the first part of the solvent when cleaning an engine. Nothing but pure, clean solvent is falling. This was previously a total loss. With the instant invention, the solvent can now be reclaimed and reused.

There has thus been outlined, rather broadly, the more important features of the invention in order that the detailed description that follows may be better understood.

It is therefore an object of the present invention to provide a new and improved waste oil and solvent recycling apparatus which has all of the advantages of the prior art waste oil recycling apparatus and none of the disadvantages.

It is another object of the present invention to provide a new and improved waste oil and solvent recycling apparatus which may be easily and efficiently manufactured and marketed.

It is a further object of the present invention to provide a new and improved waste oil and solvent recycling apparatus which is durable and reliable.

These together with other objects of the invention, along with the various features of novelty which characterize the invention, are pointed out with particularity in the claims annexed to and forming a part of this disclosure. For a better understanding of the invention, reference should be had to the accompanying drawings and descriptive matter in which there is illustrated preferred embodiments of the invention.

BRIEF DESCRIPTION OF THE DRAWINGS

FIG. 5 is a top view of the invention.

FIG. 6 is an expanded view of the locking device.

FIG. 9 is a side view of the invention showing the locking device.

DESCRIPTION OF THE PREFERRED EMBODIMENT

Figure 1:
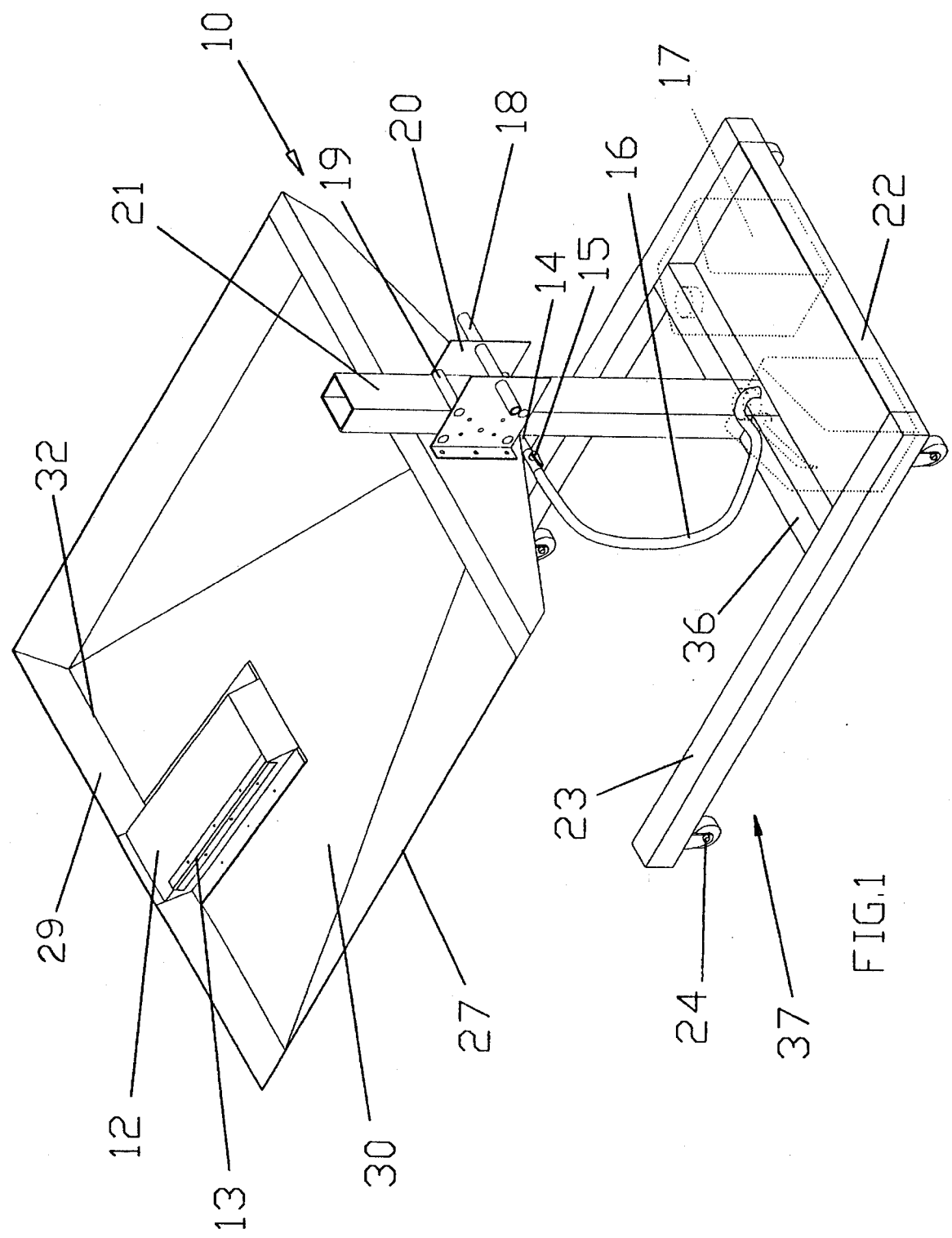
FIG. 1 is a top perspective plan view of the invention.
Figure 2:
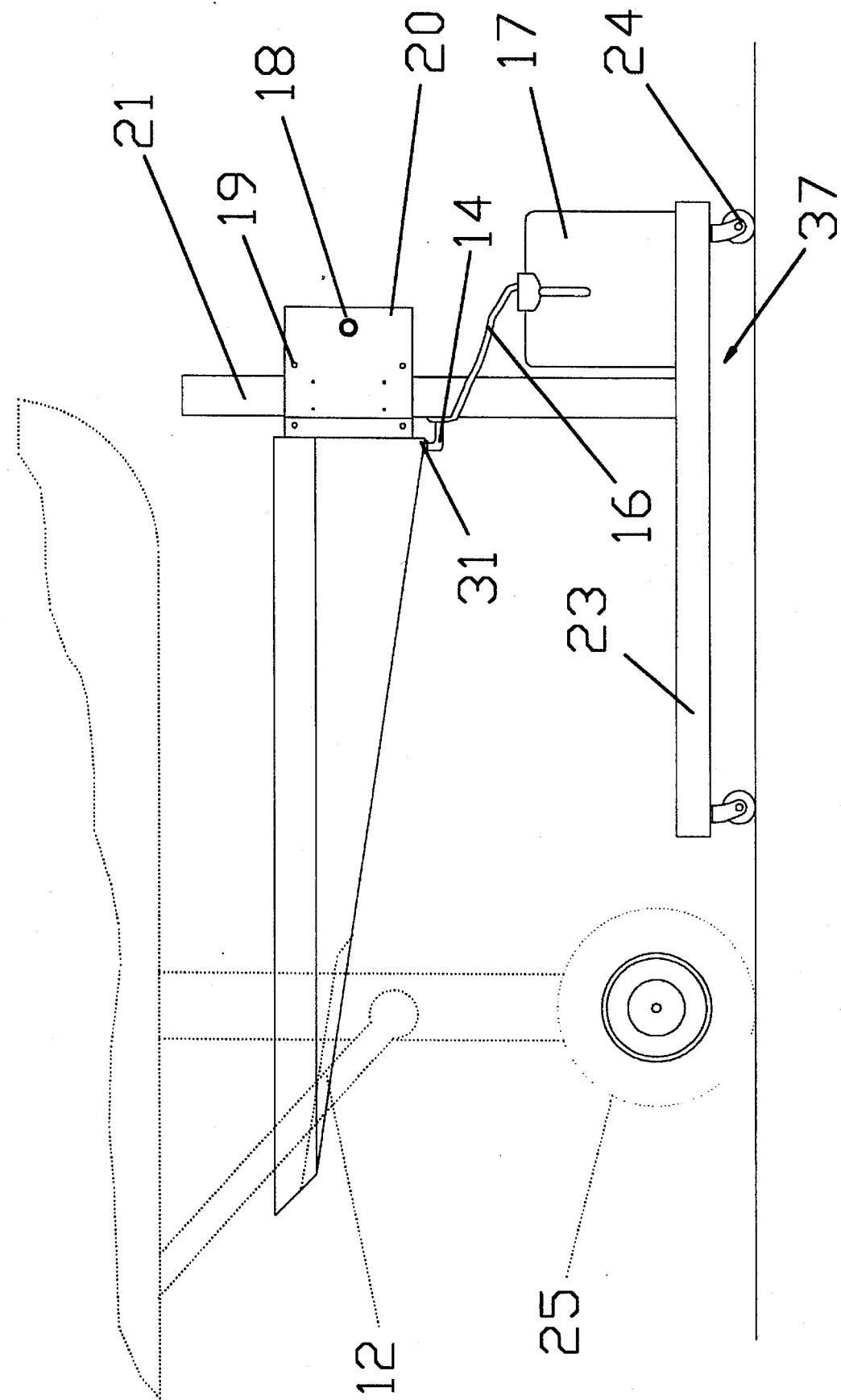
FIG. 2 is a side view of the invention in the middle position, and located underneath an aircraft.
Figure 3:
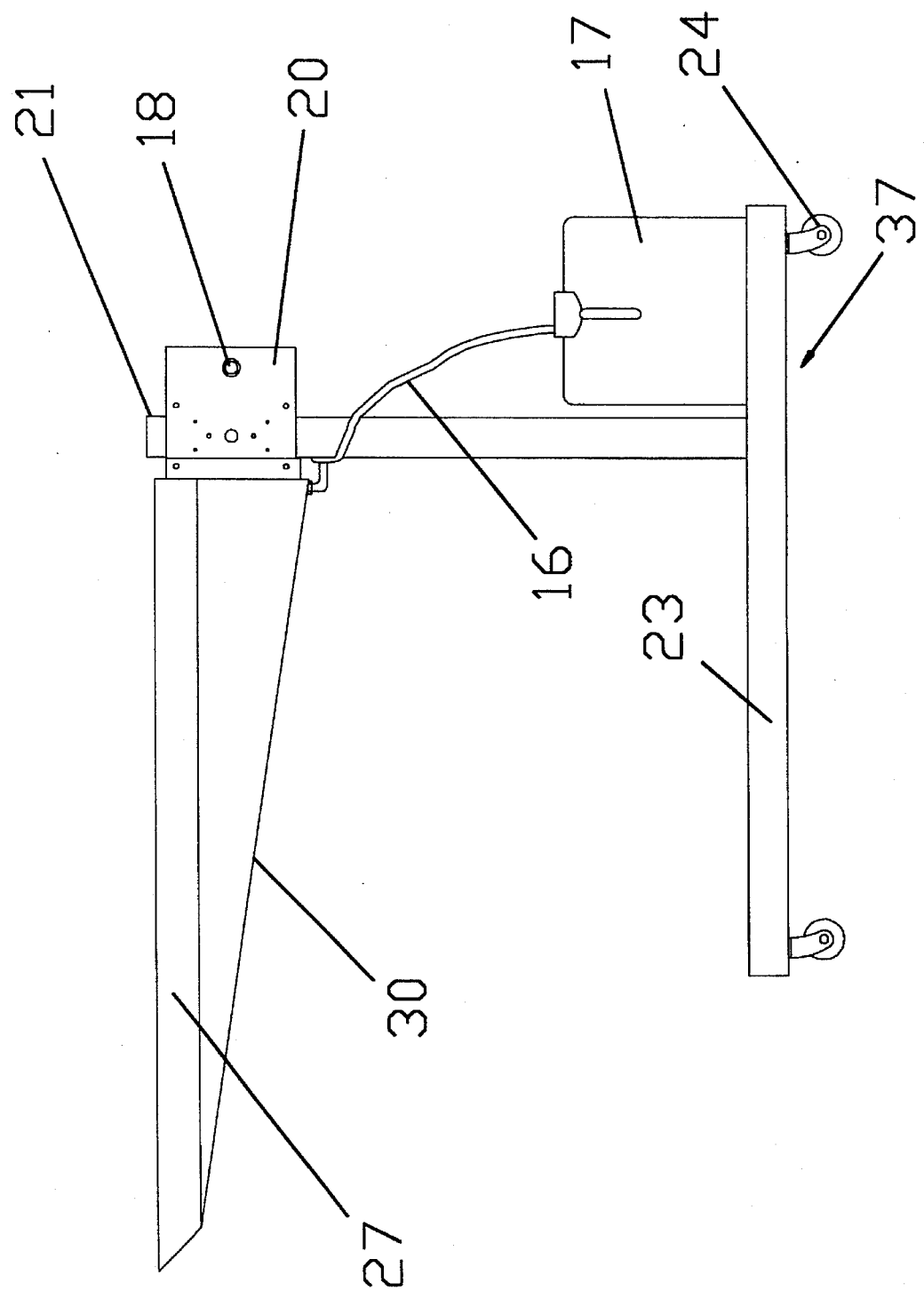
FIG. 3 is a side view of the invention in the top position with the wheel door closed.
Figure 4:
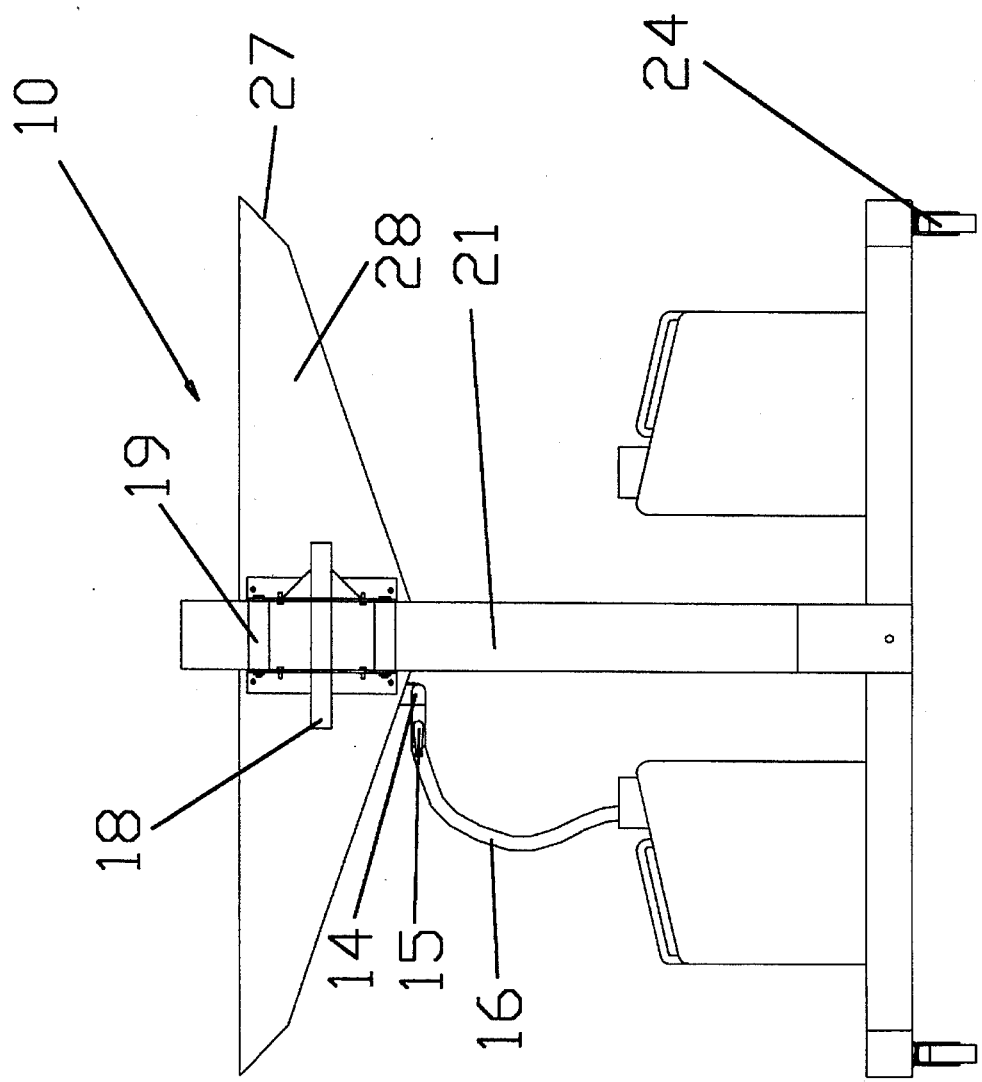
FIG. 4 is a rear view of the invention in the top position.
Figure 8:
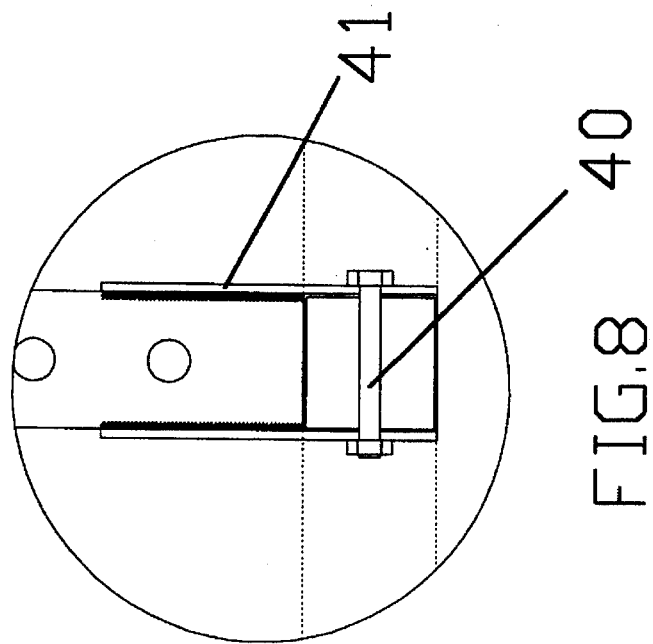
FIG. 8 is an expanded view of the vertical stand fastening.
Figure 7:
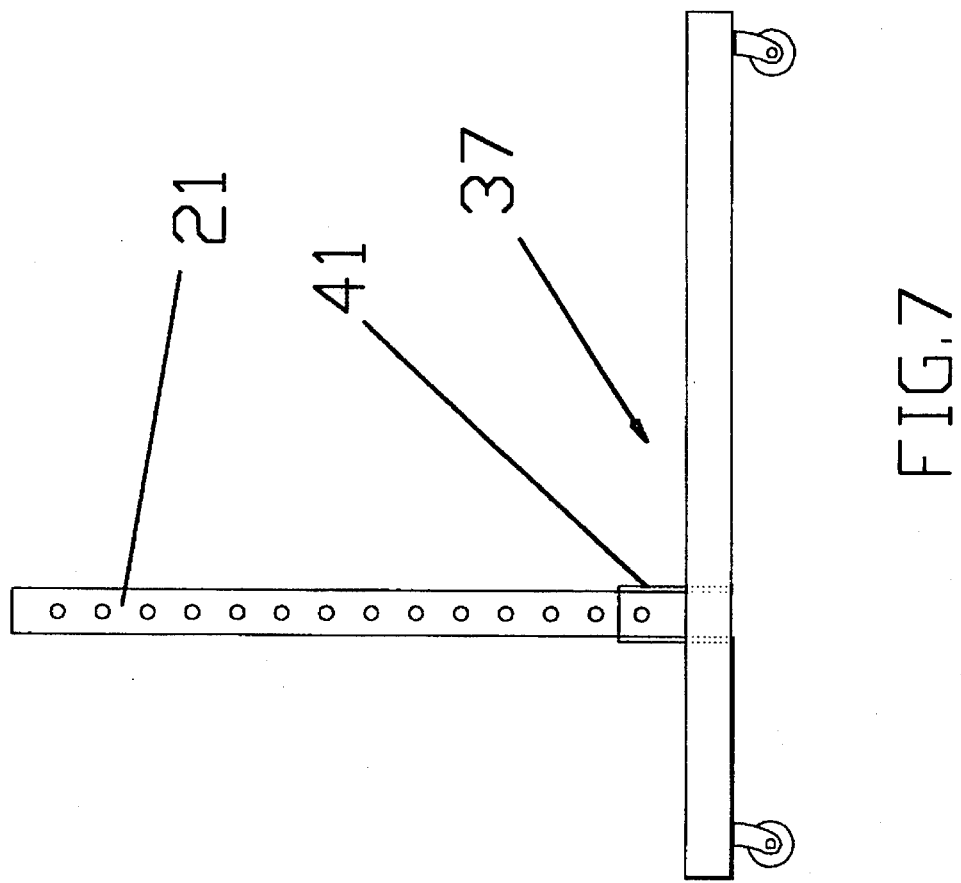
FIG. 7 is a side view of the vertical stand fastened to the base.

With reference now to the drawings, and in particular to FIGS. 2 to 5 thereof, a new and improved waste oil and solvent collector (oil changer) embodying the principles and concepts of the present invention and generally designated by the reference numeral 10 will be described.

The oil changer 10 comprises collecting tray 11 for collecting the liquids, vertical stand 21, and wheel arms 23 having casters 24. The collecting tray 11 includes slanted side walls 27, an inverted triangular shaped mounting wall 28, slanted front wall 29, and bottom wall 30. Bottom wall 30 is formed in a sloping manner, sloping downwardly from the point at which it is attached to the front wall 29 bottom edge 32 and the side walls 27 to the lowest point 31 of the mounting wall 28. Mounting wall 28 has a drain elbow 14 mounted therethrough to provide a convenient drainage point for the fluids to collect to be drained. Drain cock 15 is placed between the elbow 14 and the drain pipe 16 to shut off the flow of the fluid being collected. The opposite end of drain pipe 16 is inserted into containers 17 for collection and disposal.

Mounting plates 20 are affixed to the mounting wall 28 and are held spaced apart by spacer 19 and handle 18. The mounting plates 20 are spaced apart at a distance sufficient to fit on vertical stand 21. Nylon guides 39 are provided in the mounting plates 20 to avoid any friction as the collecting tray 11 is raised or lowered to the selected height. Height adjusting holes 33 are formed in vertical stand 21, a length of rectangular metal channel, to provide adjusting holes 33 for locating the height of tray 11 to accommodate the height and size of the aircraft or unit being serviced. Locking pin holes 34 are provided in mounting plates 20 for setting the height of tray 11 by inserting locking pin 35 through the first locking pin hole 34, and through a height adjusting hole 33 in vertical stand 21. Locking pin 35 may be spring loaded to retain the pin 35 in the locking pin holes 34.

The wheel arms 23, tray 22, and support brace 36 form the base 37 of oil changer 11. The two wheel arms 23 are spaced apart and held together in horizontal spaced relationship by affixing support brace 36 and tray 22 between the two wheel arms 23. The support brace 36, which is a rectangular metal tube, and the tray 22, which is a rectangular shape, are located nearer the end of the base 37 which is the tail end. The front end of the base 37 formed by wheel arms 23 provides a space which is sufficiently wide to straddle the nose wheel or other landing gear of an aircraft. Casters 24 are mounted at each of the ends of arms 23.

Vertical stand 21 is fastened at the center point of support brace 36. Tray 22, and support brace 36 fastened between arms 23, provide a solid base for supporting the tray 11 which is adjustably mounted on vertical stand 21, cantilevered in an extended position under the aircraft engine being serviced.

In a preferred embodiment, the tray 22 held a 2.5 gallon plastic jug (container 17) for collecting solvents, and a 5 gallon plastic jug for oil.

An added convenience is provided by providing a trap door 12, mounted with a hinge 13 to a cutout 38 in front wall 29 and bottom wall 30. When trap door 12 is opened, the oil changer 10 may be placed under an engine which is located over a landing nose wheel 25 and landing gear 26 by straddling the landing gear 26 by the cutout 38 in bottom wall 30. By placing the tray 11 further under the engine, there is a greater likelihood that all of the drained liquids will be captured. In other applications, the trap door 12 may be left closed to provide a larger collection surface area.

Casters 24 are mounted at the four corners formed by the ends of wheel arms 23 to provide for ease of maneuvering the oil changer 11 under the engine or unit to be serviced. The 360° rotation of the casters 24 provide greater flexibility for moving the oil changer 11 into service position and then into an area for storage.

As to the manner of usage and operation of the instant invention, the same should be apparent from the above disclosure, and accordingly no further discussion relative to the manner of usage and operation of the instant invention will be provided.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

What is claimed is:

1. An apparatus for collecting oil and other fluids and solvents for re-use or for recycling, said apparatus comprising:

base support means for supporting a waste oil and solvent collecting first tray in a limited space, two horizontal wheel arms, each of said wheel arms having a front end and a tail end, each of said ends having a caster mounted thereon, said wheel arms being spaced apart by a support brace, and a second tray, said support brace and said second tray being affixed to said wheel arms near said tail end, said front end having an open space between said wheel arms at said front end, a rectangular shaped, vertical support affixed to said support brace, said vertical support having a plurality of equally spaced adjusting holes formed along its length, a liquid collecting first tray, adjustably mounted on said vertical support, said first tray having a front wall, side walls, a bottom wall, and a mounting wall, said mounting wall having mounting plates affixed vertically thereto and spaced apart by spacers and a handle at a sufficient distance to fit said vertical support, said mounting plates having locking pin holes for engagement with locking means inserted through said locking pin holes and said adjusting holes for locking said first tray in a selected vertical position, said mounting wall having a drain elbow mounted therein and a drain cock and tube attached to said elbow for draining said fluids, and fluid containers supported on said second tray, said tube being inserted into one of said containers for filling with said drained fluids.

2. The apparatus for collecting oil and other fluids according to claim 1 wherein said first tray is provided with a trap door hinged to a cutout in said front wall and said bottom wall to provide clearance for straddling the landing gear of an aircraft when necessary.

3. The apparatus for collecting oil and other fluids according to claim 1 wherein said collecting first tray comprises an inverted triangular shaped mounting wall and said bottom wall is formed sloping downwardly from a point at which it is attached to said front wall to a lowest point of said mounting wall.

* * * * *